United States Patent

Fleming et al.

[11] 4,055,309
[45] Oct. 25, 1977

[54] ADJUSTABLE CUTTER BAR SUPPORT

[75] Inventors: Phillip F. Fleming; Steven J. Campbell, both of West Bend, Wis.

[73] Assignee: Gehl Company, West Bend, Wis.

[21] Appl. No.: 731,121

[22] Filed: Oct. 12, 1976

[51] Int. Cl.² ............................................. B02C 18/16
[52] U.S. Cl. ...................................... 241/221; 83/349; 83/356.1; 83/658; 144/218; 241/241; 241/286
[58] Field of Search ............... 241/221, 222, 240, 241, 241/286; 83/349, 356.1, 658; 144/218

[56] References Cited

U.S. PATENT DOCUMENTS

| | | | |
|---|---|---|---|
| 2,830,770 | 4/1958 | De Luca | 241/222 UX |
| 2,890,840 | 6/1959 | Fletcher et al. | 241/222 UX |
| 3,342,231 | 9/1967 | Waldrop | 241/222 |
| 3,805,660 | 4/1974 | Burrough | 83/658 |
| 3,904,138 | 9/1975 | Maier et al. | 241/221 X |

Primary Examiner—Gerald A. Dost
Assistant Examiner—Howard N. Goldberg
Attorney, Agent, or Firm—James E. Nilles

[57] ABSTRACT

A support structure for a cutter bar for use in a forage harvester, the support structure adjustably supporting the opposite ends of the cutter bar and providing a convenient readily adjustable structure for supporting the central portion of the cutter bar to prevent movement of the central portion of the cutter bar relative to the cutting cylinder of the forage harvester and to afford adjustment of the position of the central portion of the cutter bar relative to the blades of the cutting cylinder.

13 Claims, 5 Drawing Figures

ADJUSTABLE CUTTER BAR SUPPORT

BACKGROUND OF THE INVENTION

The present invention relates to forage harvesters having rotating cutting cylinders and an elongated cutter bar supported in closely adjacent relationship to the cutting cylinder whereby crop material can be chopped between knives supported by the cutting cylinder and the cutter bar. More particularly, the invention relates to means for adjustably supporting the cutter bar along its length such that every portion of the cutter bar can be accurately positioned relative to the knives of the cutting cylinder and in such a manner that the center portion of the cutter bar is not permitted to bend or otherwise deform under the cutting force of the knives.

The forage harvesters which have been more recently developed have increased crop handling capacities and have included cutting cylinders of increased length. As a result of the use of longer cutting cylinders, complementary cutter bars have also become elongated to the extent that the cutter bars may tend to deflect or otherwise distort at their mid-sections due to the force on the cutter bar generated by crop material being cut between the cutting cylinder and the cutter bar.

Some of the prior art apparatus have sought to prevent this distortion of the cutter bar by securing the center portion of the cutter bar to the cutter bar support structure by a bolt or the like. However, it is generally necessary to regrind or sharpen the blades of the cutting cylinder thereby changing the gap between the cutting edge of the blades and the cutter bar and consequently it is necessary to adjust the relative position of the cutter bar. The prior art means for supporting the center portion of the cutter bar make such adjustment difficult because they are difficult to reach, requiring the operator to crawl under the forage harvester first to loosen the bolt and then later to secure the bolt after adjusting the position of the cutter bar.

SUMMARY OF THE INVENTION

The present invention provides an improved means for adjustably supporting the central portion of the cutter bar to prevent deformation of the cutter bar, and including means for adjusting the position of the central portion of the cutter bar to provide the proper clearance between the center portion of the cutter bar and the cutting cylinder, and the means for adjusting being operable from a position at the side of the forage harvester.

The cutter bar of the forage harvester is supported on the upper surface of a support channel and is slideable horizontally thereon, toward and away from the cylinder. The opposite ends of the cutter bar each include generally horizontal bores for receiving an adjustment bolt which is in turn supported by a bracket rigidly secured to a side wall of the forage harvester. A second pair of generally vertically extending bolts are also threadably supported by the bracket and can be received against the upper surface of the end of the cutter bar to hold it down against the cutter bar supporting channel.

The central portion of the cutter bar includes a bore in its bottom surface, the bore receiving an upwardly projecting end of a cutter bar guide pin which extends upwardly through a slot in the cutter bar support channel and which is rigidly attached to the end of a support shaft. Rotation of the support shaft results in arcuate movement of the guide pin, and thus the central portion of the cutter bar can be adjustably moved toward or away from the cutting cylinder by rotation of the shaft. The support shaft extends parallel to the cutter bar and to the longitudinal axis of the cutting cylinder and is positioned directly below the cutter bar and cutter bar support surface. The end of the support shaft, opposite that having the guide in attached thereto extends outwardly from the forage harvester side plate and is readily accessible. The support shaft can be secured against rotation about its longitudinal axis thereby preventing relative movement of the guide pin and horizontal movement of the central portion of the cutter bar.

Since the end of the support shaft extends laterally outwardly from the machine, its relative position and that of the central portion of the cutter bar can be easily adjusted. The operator is not required to crawl underneath the forage harvester thus eliminating adjustment time and reducing risk to the operator.

Further advantages of the invention will be made apparent in the following description of a preferred embodiment of the invention.

DESCRIPTION OF THE PREFERRED EMBODIMENT

Figure 1:
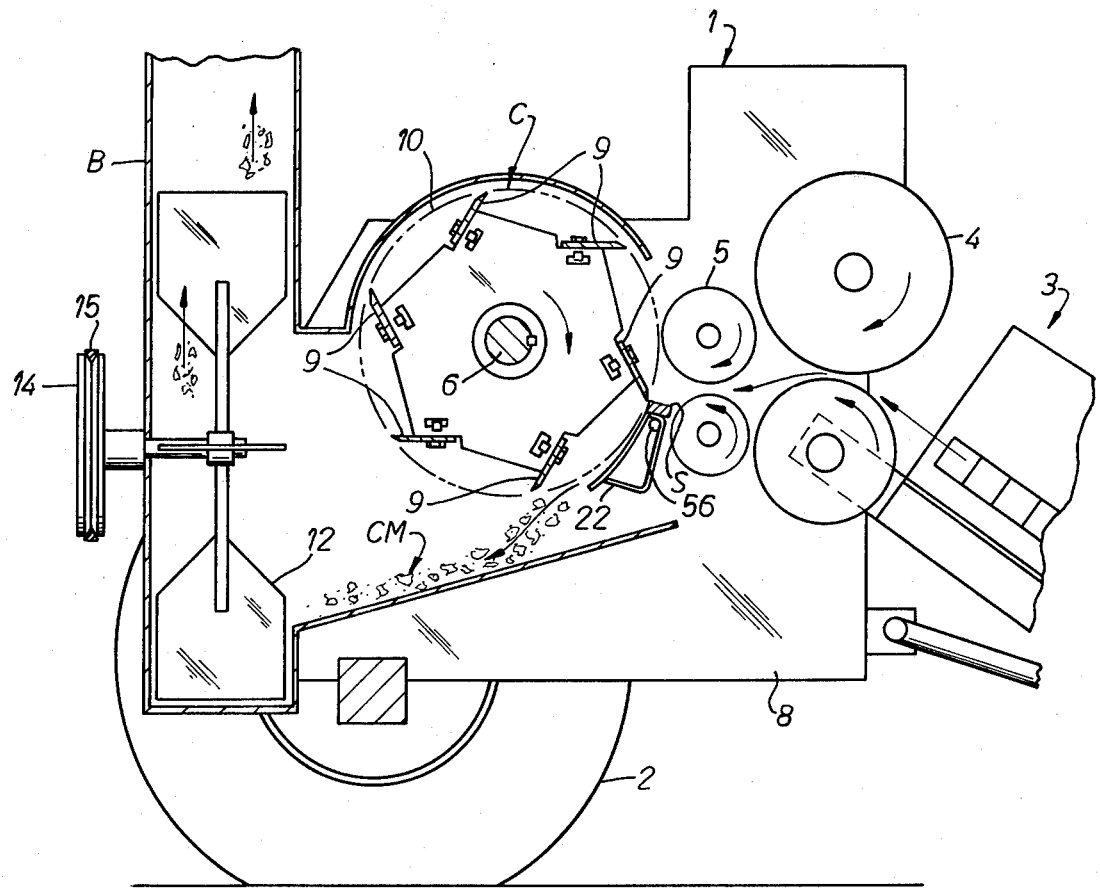
FIG. 1 is a side elevation view of a portion of a forage harvester embodying the present invention.

A forage harvester embodying the present invention is shown in FIG. 1 as including a main frame 1 having ground engaging wheels 2 (only one showing) at opposite sides and a crop receiving portion 3 which delivers the crop in a well known manner to pairs of opposed feed rolls 4 and 5. A rotating chopping cylinder C is journalled on a shaft 6, which extends between the vertical side wall 7 and 8 (FIG. 2) of the main frame 1 for rotation about its longitudinal axis. The cylinder C is shown as including a series of circumferentially spaced conventional knives 9 which, when the cylinder C is rotating, define an imaginary cylindrical surface 10. A blower B including a rotateable multi-paddle fan 12 is located at the rear of the forage harvester and acts to receive cut crop material CM which is cut by the cylinder C and thrown rearwardly into the blower. The paddles of the multi-paddle fan 12, are caused to rotate by a pulley 14 which is driven by an endless belt 15 from a power source (not shown) in a conventional manner.

Figure 2:
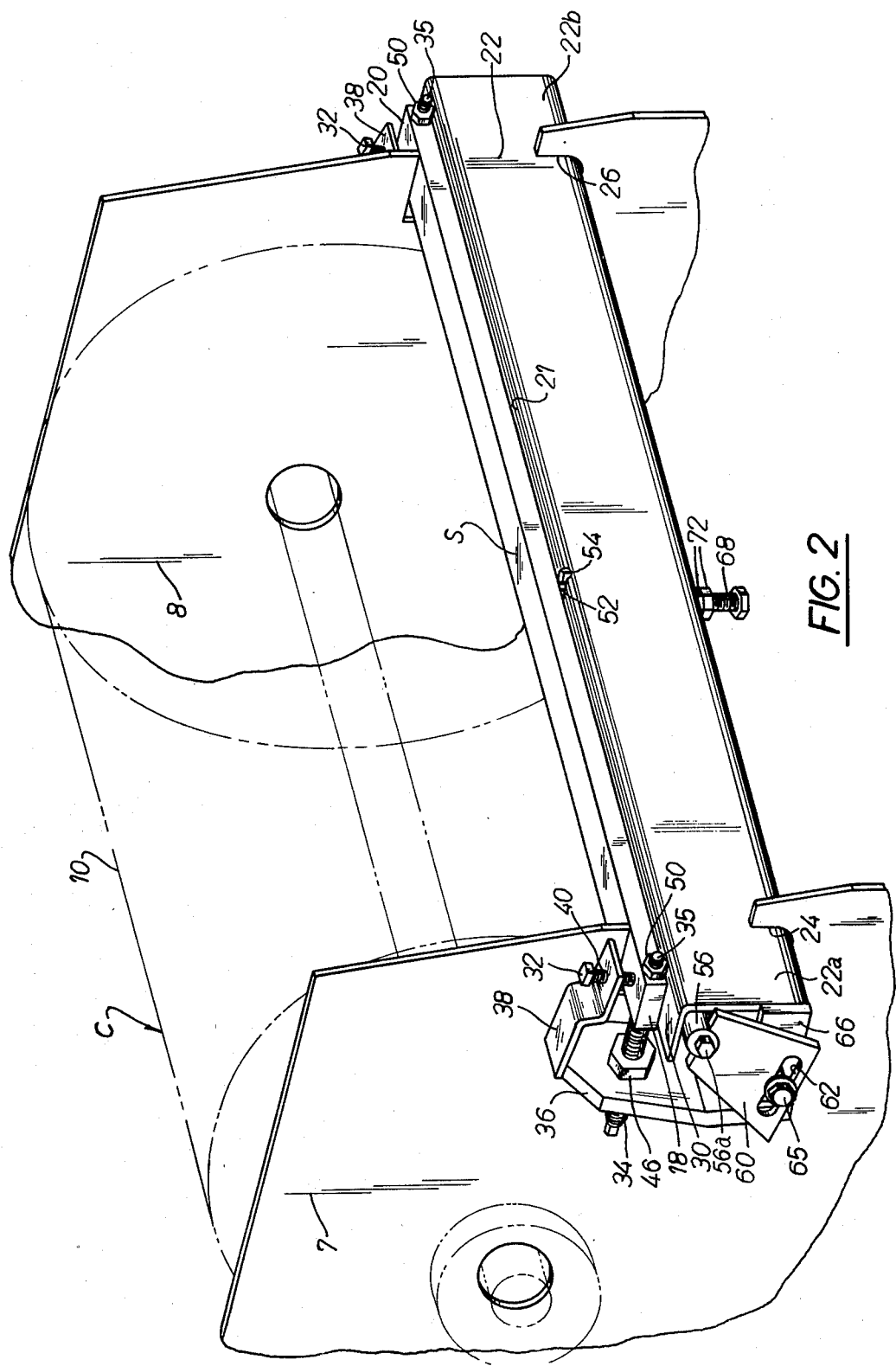
FIG. 2 is a cut-away perspective view of portions of the forage harvester shown in FIG. 1 and showing the cutter bar and cutter bar support.
Figure 3:
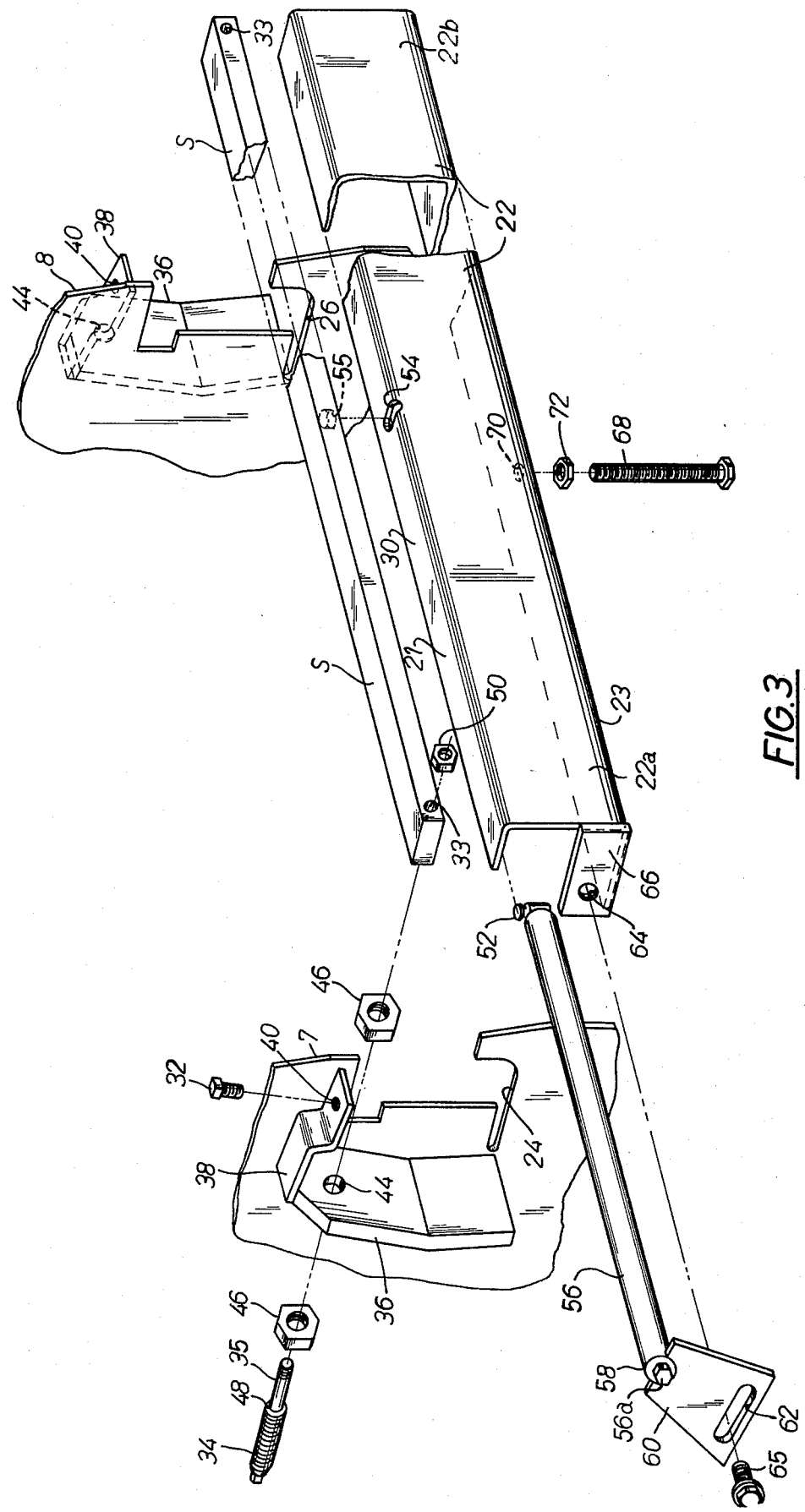
FIG. 3 is an exploded perspective view of the cutter bar and cutter bar support structure shown in FIG. 2.

A cutter bar or shear bar S is positioned immediately forward of the chopping cylinder C in closely adjacent relationship thereto, whereby the knives 9 may function in combination with the cutter bar S to cut crop material fed to the cylinder by the feed rolls 4 and 5. The cutter bar S extends laterally between the side walls 7 and 8 parallel to the longitudinal axis of the cylinder C and, as shown in FIG. 2, includes ends 18 and 20 which project outwardly from the side walls 7 and 8, respectively. The cutter bar S is supported by an upper flange 21 of a laterally extending cutter bar support channel 22 the support channel being rigidly supported at its opposite ends by the vertical side walls 7 and 8 within contour slots 24 and 26 respectively and is positioned such that the opposite ends 22a and 22b of the support channel 22 extend outwardly beyond the side walls 7 and 8 respectively.

The upper flange 21 of the cutter bar support channel 22 includes a flat upper generally horizontal cutter bar support surface 30 defining a plane which generally includes the longitudinal axis of the cylinder C. The support surface 30 of the upper flange 21 is intended to provide slideable support for the cutter bar S such that the cutter bar S is moveable in a generally horizontal plane toward and away from the cylinder C, whereby the gap formed between the knives 9 and the center bar S can be adjusted to compensate for wear of the knives and to facilitate accurate alignment of the cutter bar S.

In order to facilitate such adjustments or alignments of the cutter bar S, each of the opposite ends 18 and 20 are releasably secured by a set screw 32 and by a threaded cutter bar adjustment stud 34. A generally vertical plate 36 is welded or otherwise rigidly secured to each of the side walls 7 and 8 to project perpendicularly outwardly therefrom and to provide a cutter bar stud support. A generally horizontal angular bracket 38 is also rigidly secured to each of the side walls 7 and 8 adjacent the upper end of the vertical plate 36 and projects perpendicularly out from the side wall. The set screw 32 is received through a threaded bore 40 in the horizontal angular plate 38 whereby the lower end of the set screw can be received against the upper surface of the respective projecting end of the cutter bar S. The set screw 32 thus provides a means for securing the cutter bar S firmly against the cutter bar support surface 30.

In order to facilitate generally horizontal adjustment of the cutter bar S, i.e., movement of the cutter bar S toward or away from the knives 9, a threaded cutter bar adjustment stud 34 is received through a generally horizontal bore 44 in the vertical plate 36 and lock nuts 46 are received on opposite sides of the vertical plate 36. The adjustment stud 34 includes a portion of reduced diameter 35 receivable in a generally horizontal bore 33 in the end of the cutter bar S and a shoulder 48 to be received against the cutter bar S and a restraining nut 50 is threadably received on the end of the adjustment stud 34 and against the cutter bar S whereby the cutter bar S may be clampingly secured between the shoulder 48 and the nut 50. Since the adjustment stud is threadably received in bore 44, rotation of the adjustment stud can cause movement of the cutter bar toward or away from knives 9.

In order to provide means for both adjusting the position of the central portion of the cutter bar to afford accurate spacing between the central part of the cutter bar and the cutting cylinder and for restraining the center portion of the cutter bar S against slideable movement away from the knives 9, due to the force on the cutter bar generated by the chopping action, a cutter bar guide pin 52 constituting a projection or portion which is rigidly secured to the end of an elongated shiftable member comprised of a cutter bar support rod or shaft 56, which is received within the channel 22 and which has extending ends projecting outwardly beyond the end 22a of the channel 22. The bar S has a bore 55 in its central portion and channel 22 has an opening 54 through its central portion. Projection 52 extends through opening 54 and into bore 55. The elongated support shaft 56 is disposed below cutter bar S and has a longitudinal axis parallel to the cutter bar S and parallel to the longitudinal axis of cylinder C. The elongated support shaft 56 is supported at its outwardly extending end 58 by means for releasably preventing rotation of the shaft and including a generally vertically orientated plate 60 welded or otherwise rigidly secured to the outwardly extending end 58. The vertical plate 60 includes a slot 62 therein spaced from and transverse to the axis of the support rod 56 and a bolt 65 is slideably receivable through slot 62 and threadably received within a bore 64 in a vertical rigid plate 66, in turn welded or the like to the end 22a of the channel 20. The end of the support shaft 56 supporting the guide pin 52 is biased upwardly against the channel 22 by a bolt receivable through a threaded bore 70 in the lower flange 23 of the channel 22. The bolt 68 can be restrained against movement by a pair of lock nuts 72.

Figure 4:
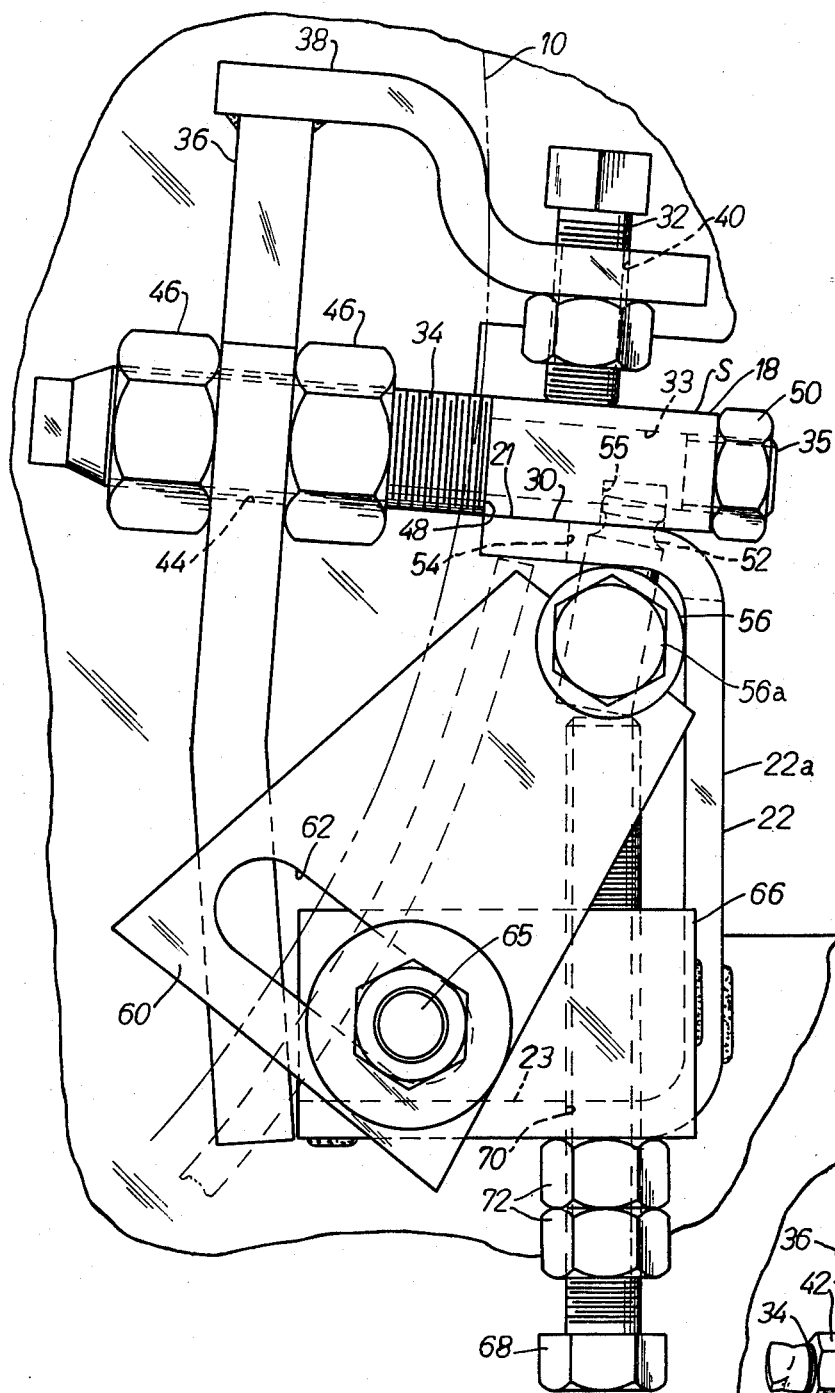
FIG. 4 is an enlarged side elevation view of the cutter bar and cutter support structure shown in FIG. 2.
Figure 5:
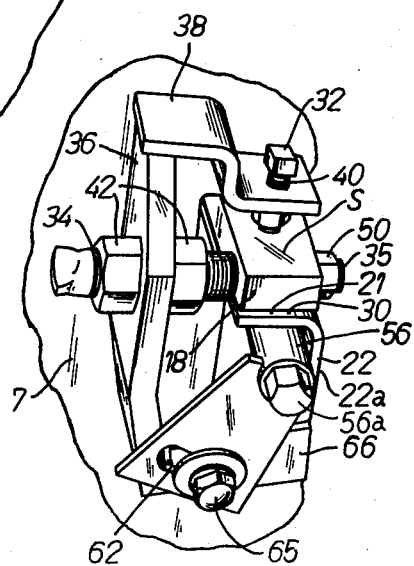
FIG. 5 is another perspective view of the cutter bar and cutter bar support structure shown in FIG. 2.

By rotation of the support rod 56 in a counterclockwise direction, as viewed in FIG. 4, by applying a wrench or the like to the nut 56a welded to the outwardly extending end 58 of the shaft 56, the guide pin 52 can be caused to distort the center portion of the cutter bar S toward the knives 9, and when the plate 60 is then secured against movement, the support rod 56 and guide pin 52 will prevent the center portion of the cutter bar from movement away from the knives 9. Since the central portion of the cutter bar will frequently wear more than its ends, the adjustment feature is particularly useful in affording distortion of the central portion of the cutter bar toward the cutting cylinder to maintain uniform clearance between the cutting cylinder and the cutter bar along its length regardless of uneven wear of the cutter bar. The mechanical elements described above which project outwardly from the side walls 7 and 8 of the forage harvester are readily accessible to the operator, therefore, adjustment of the position of the cutter bar can be accomplished easily.

We claim:

1. In a forage harvester of the type having a rotatable chopping cylinder and an elongated shear bar having a longitudinal axis, located adjacent said chopping cylinder for cutting cooperation therewith, means for adjusting a central portion of said shear bar toward and away from said chopping cylinder, said means comprising an elongated shiftable member having an axis parallel to the longitudinal axis of said elongated shear bar and having one portion engagable with said central portion of said bar, whereby shifting of said member causes corresponding movement of said central portion of said cutter bar toward and away from said cylinder, means for shifting said elongated shiftable member to any one of a plurality of adjusted positions, said elongated shiftable member comprising a shaft rotatable about said axis and including a projection extending therefrom and engagable with said central portion, and further including means for releasably securing said shiftable member against shiftable movement.

2. The apparatus set forth in claim 1 wherein said means for releasably securing said shiftable member includes a plate extending radially from said shaft and being rigidly secured thereto, said plate defining a plane perpendicular to said axis.

3. A forage harvester including:
a frame having a pair of opposite side walls;

a crop cutting cylinder supported between said side walls and rotatable about a longitudinal axis for cutting crop material;

an elongated cutter bar having opposite ends and a central portion intermediate said opposite ends, said elongated cutter bar positioned parallel to said longitudinal axis and in closely adjacent relationship to said cutting cylinder whereby crop material may be cut between said cutting cylinder and said cutter bar; and means for supporting said elongated cutter bar, and including adjustable means for supporting said central portion of said cutter bar and for preventing movement of said central portion away from said cutting cylinder, said adjustable means including an elongated member supported for rotation about an axis parallel to said longitudinal axis and including means for engaging said central portion and means for releasably preventing rotation of said elongated member whereby said central portion is prevented from moving toward and away from said cutting cylinder.

4. The forage harvester set forth in claim 3 further including means for adjusting the position of the opposite ends of said cutter bar, including a support bracket secured to said frame and threaded adjustment means between said support bracket and one of said opposite ends of said cutter bar for causing movement of said one of said opposite ends of said cutter bar toward and away from said cylinder.

5. The forage harvester set forth in claim 3 wherein said elongated member has opposite ends and wherein said means for supporting said central portion of said cutter bar includes a projection supported by said one of said opposite ends of said elongated member and extending radially therefrom and swingable through an arc upon rotational movement of said elongated member and wherein said central portion includes a bore therein for receiving said projection.

6. The forage harvester set forth in claim 3 wherein said means for releasably preventing rotation of said elongated member includes a plate rigidly connected to said elongated member and swingable through an arc upon rotational movement of said elongated member, said plate defining a plane generally perpendicular to the longitudinal axis of said elongated member, and means for releasably securing said plate to said frame.

7. The forage harvester set forth in claim 6 wherein said plate includes a slot therein, said slot being spaced from said longitudinal axis and extending generally transverse to said axis, and wherein said means for releasably securing said plate includes a bolt received through said slot and supported by said frame.

8. In a forage harvester including a frame having a pair of opposed side walls, a rotatable cylinder supported between said side walls and having a longitudinal axis of rotation, and an elongated cutter bar having opposite ends and a central portion intermediate said opposite ends and positioned parallel to said longitudinal axis in closely adjacent relationship to said cylinder whereby crop material can be cut between said cylinder and said cutter bar: means for adjustably supporting said cutter bar including adjustable means for supporting said central portion of said cutter bar and for preventing movement of said central portion away from said cutting cylinder, said adjustable means including an elongated shaft supported for rotation about an axis parallel to said longitudinal axis and including opposite ends, one of said opposite ends of said elongated shaft engaging said central portion, and including means for releasably securing the other of said opposite ends of said elongated shaft to said frame and for releasably preventing rotation of said elongated shaft.

9. The apparatus set forth in claim 8 wherein said means for adjustably supporting said cutter bar further includes an adjustable means for preventing upward movement of said cutter bar, said adjustable means being supported by one of said side walls and receivable against one of said opposite ends of said cutter bar, and means for moving said cutter bar toward said longitudinal axis including a threaded stud supported by one of said side walls and engagable with said one of said opposite ends of said cutter bar.

10. The forage harvester set forth in claim 8 wherein said means for supporting said central portion of said cutter bar includes a projection supported by said one of said opposite ends of said elongated shaft and extending radially therefrom and swingable through an arc upon rotational movement of said elongated shaft and wherein said central portion includes a bore therein for receiving said projection.

11. The forage harvester set forth in claim 8 wherein said means for releasably securing the other of said opposite ends of said elongated shaft to said frame includes a plate rigidly connected to said other of said opposite ends of said elongated shaft, said plate defining a plane generally perpendicular to the axis of said elongated shaft, and includes means for releasably securing said plate against swingable movement.

12. The forage harvester set forth in claim 11 wherein said plate includes a slot therein, said slot being spaced from said longitudinal axis and extending generally transverse to said axis, and wherein said means for releasably securing said plate against swingable movement includes a bolt received through said slot and supportable by said frame.

13. A forage harvester including:
a frame having a pair of opposite side walls;
a crop cutting cylinder supported between said side walls and rotatable about a longitudinal axis for cutting crop material;
an elongated cutter bar having opposite ends and a central portion intermediate said opposite ends, said elongated cutter bar positioned parallel to said longitudinal axis and in closely adjacent relationship to said cutting cylinder whereby crop material may be cut between said cutting cylinder and said cutter bar; and
means for supporting said elongated cutter bar, including an elongated support rigidly supported between said side walls and having an upper surface for slideably supporting said cutter bar for movement toward and away from said crop cutting cylinder, and including means for adjustably supporting the opposite ends of the cutter bar and for moving the cutter bar toward and away from the cutting cylinder and including a bracket secured to said frame, a first threaded rotatable member received through said bracket and engagable with one of said opposite ends, rotation of said first threaded member causing movement of said cutter bar relative to said longitudinal axis and means supported by said frame and for releasably securing said one of said opposite ends against said upper surface, and including adjustable means for supporting said central portion of said cutter bar and for preventing movement of said central portion away from said cutting cylinder member, said adjustable means for supporting said central portion of said cutter bar including an elongated member supported for rotation about an axis parallel to said longitudinal axis and including opposite ends, one of said opposite ends of said elongated member supporting a projection extending radially outwardly from said elongated member relative to the longitudinal axis of said elongated member and for engaging said central portion, and means for releasably securing the other of said opposite ends of said elongated member to said frame for releasably securing said elongated member against rotation, and wherein said central portion includes a bore therein for receiving said projection.

* * * * *